United States Patent [19]

Hayashi et al.

[11] 4,444,709
[45] Apr. 24, 1984

[54] PROCESS FOR CONTINUOUSLY PRODUCING A POLYMERIC LAMINATE TAPE HAVING A PLURALITY OF METAL WIRES EMBEDDED THEREWITHIN

[75] Inventors: Masumi Hayashi; Kazuo Ogawa; Katsumi Kimura; Hiroshi Ishii; Satoshi Bandai, all of Ichihara, Japan

[73] Assignee: UBE Industries, Ltd.

[21] Appl. No.: 354,543

[22] Filed: Mar. 4, 1982

[30] Foreign Application Priority Data

Mar. 12, 1981 [JP] Japan .................................. 56-34566

[51] Int. Cl.³ .............................................. B29F 3/10
[52] U.S. Cl. .................................... 264/174; 156/436; 156/555; 264/248; 264/272.11
[58] Field of Search .............. 264/104, 174, 248, 249, 264/272.11; 156/178, 179, 436, 555

[56] References Cited

U.S. PATENT DOCUMENTS

| | | | |
|---|---|---|---|
| 3,082,292 | 3/1963 | Gore .................................. | 264/174 |
| 3,544,665 | 12/1970 | Bowers .............................. | 264/174 |
| 3,965,226 | 6/1976 | Werwitzke et al. ................ | 264/174 |
| 3,971,883 | 7/1976 | Meeks et al. ....................... | 264/174 |
| 3,971,884 | 7/1976 | Meeks et al. ....................... | 264/174 |
| 4,001,065 | 1/1977 | Penneck et al. .................... | 264/230 |
| 4,055,526 | 10/1977 | Kiyokawa et al. ................. | 264/174 |
| 4,096,216 | 6/1978 | Yevick ................................ | 264/248 |

Primary Examiner—Donald E. Czaja
Assistant Examiner—W. J. Thompson
Attorney, Agent, or Firm—Burgess, Ryan & Wayne

[57] ABSTRACT

A metal wire-containing polymeric laminate tape is continuously produced by superimposing a pair of primary cross-linked, electro-insulating thermoplastic polymer tapes side by side along the longitudinal axes thereof under tension, while a plurality of metal wires are interposed, under tension, in parallel to each other, between the primary tapes along the longitudinal axes thereof; by heating the resultant precursory laminate tape up to a temperature of from 10° to 120° C. above the melting point of the corresponding thermoplastic polymer, which is not cross-linked; by pressing the heated precursory laminate tape by using a pair of elastic pressing rolls, whereby the primary tapes are heat-bonded together to provide a body of laminate matrix within which the metal wires are embedded; and, optionally, by cooling the resultant laminate tape.

13 Claims, 2 Drawing Figures

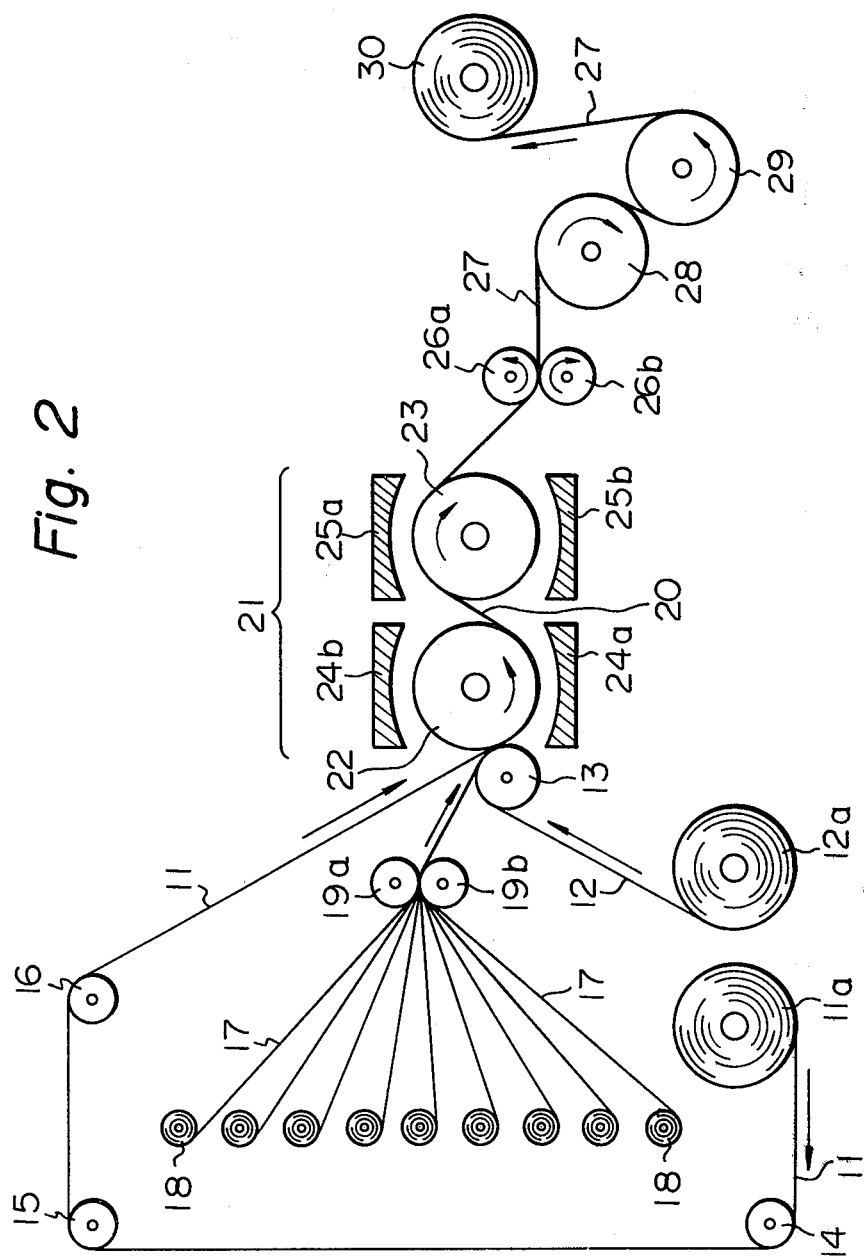

4,444,709

PROCESS FOR CONTINUOUSLY PRODUCING A POLYMERIC LAMINATE TAPE HAVING A PLURALITY OF METAL WIRES EMBEDDED THEREWITHIN

FIELD OF THE INVENTION

The present invention relates to a process for continuously producing a polymeric laminate tape having a plurality of metal wires embedded therein. More particularly, the present invention relates to a process for continuously producing a polymeric laminate tape in which a pair of primary polymeric tapes are bonded side by side and a plurality of metal wires are inserted between the primary polymeric tapes and extend in parallel to each other along the longitudinal axes of the primary tapes.

BACKGROUND OF THE INVENTION

It is known that a composite tape comprising a thermoplastic electro-insulating polymeric matrix and a plurality of metal wires, which are capable of generating heat when an electric current is applied thereto and which are embedded within the matrix, is useful as a heating element. This type of heating element is useful for forming a large area of heat source and, therefore, is beneficially built in a heating device having a large surface area, such as a heating board or a heating carpet.

In a conventional process for producing a composite tape having heat-generating metal wires embedded therewithin, a thermoplastic electro-insulating polymer is melted in an extruder and is extruded through a crosshead die of the extruder to form a tape-shaped stream of the melted polymer, while a plurality of the metal wires are fed through the crosshead die into the tape-shaped stream of the melted polymer to provide a composite stream, and the composite stream is cooled to form a solidified composite tape.

The above-mentioned conventional process has the following disadvantages:

(1) Since the metal wires are incorporated into the polymer matrix while the matrix is in the fluid melt state, the thickness of the polymer layer surrounding each metal wire frequently becomes uneven. Therefore, it is very difficult to locate the wires exactly in the middle portion of the polymer matrix layer.

(2) The arrangement of the metal wires in the polymer matrix frequently becomes uneven because the wire can easily move while the polymer matrix is in the fluid melt state.

(3) In the extruding procedure, only a thermoplastic polymer which is not crosslinked can be used. A crosslinked thermoplastic polymer cannot be melted and, therefore, cannot be used for the extruding procedure. Accordingly, after the metal wires are embedded, the polymer matrix should be crosslinked so as to enhance the heat resistance thereof.

Usually, the crosslinking procedure is carried out by applying electron beams to the polymer matrix under a high voltage. This procedure is extremely dangerous for workers due to the high electroconductivity of the metal wires. Also, the crosslinking effect cannot be attained at portions of the polymer matrix which are obstructed by the metal wires from the electron beams. And since the non-cross-linked portions of the polymer matrix exhibit a poor heat resistance, the resultant products are sometimes useless.

In another conventional process for producing a composite tape containing metal wires, a pair of primary thermoplastic polymer tapes are fuse-bonded side by side while a plurality of metal wires are interposed between the primary thermoplastic polymer tapes. This conventional process has the following disadvantages:

(1) When the primary tapes are fuse-bonded to each other, air bubbles are formed around the metal wires interposed between the primary tapes. When the resultant composite tape is used as a heating element, the air bubbles are heated and expanded, and the expanded air bubbles sometimes cause the bonded primary tapes to be separated from each other or to be ruptured.

(2) It is very difficult to fuse-bond primary tapes having a very small thickness of 200 microns or less without breaking the primary tapes.

(3) The crosslinking procedure for the resultant composite tape involves the same difficulty as that mentioned above.

SUMMARY OF THE INVENTION

An object of the present invention is to provide a process for continuously producing a polymeric laminate tape having a plurality of metal wires embedded therewithin, it being unnecessary for the resultant laminate tape to be subjected to a crosslinking procedure for the polymer matrix thereof.

Another object of the present invention is to provide a process for continuously producing a polymeric laminate tape having a plurality of metal wires embedded therewithin, in which process a polymer matrix for containing the metal wires is formed from two primary polymer tapes without difficulty.

Still another object of the present invention is to provide a process for continuously producing a polymeric laminate tape having a plurality of metal wires embedded therewithin, in which process air bubbles formed around the metal wires can be easily removed.

A further object of the present invention is to provide a process for continuously producing a polymeric laminate tape having a plurality of metal wires embedded therewithin, in which process the metal wires can be located in accordance with a predetermined arrangement exactly in the middle layer portion of the polymer matrix of the laminate tape.

The above-mentioned objects can be attained by the process of the present invention, which comprises the continuous steps of:

superimposing a pair of primary tapes, comprising an electro-insulating thermoplastic polymer which has been crosslinked, on each other along the longitudinal axes thereof under tension, while a plurality of metal wires are interposed, in parallel to each other, between the primary tapes along the longitudinal axes of the primary tapes under tension to provide a precursory laminate tape;

heating the precursory laminate tape up to a temperature of from 10° to 120° C. above the melting point of the corresponding electro-insulating thermoplastic polymer which is not crosslinked; and pressing the heated precursory laminate tape by using a pair of pressing rolls each having an elastic peripheral surface layer thereof, whereby the primary tapes are heat-bonded to each other to form a body of electro-insulating polymer matrix within which the metal wires are embedded.

Optionally, the pressing procedure is followed by a cooling procedure for the resultant laminate tape.

BRIEF DESCRIPTION OF THE DRAWINGS

FIG. 2 is an explanatory diagram of an embodiment of the apparatus for carrying out the process of the present invention.

DETAILED DESCRIPTION OF THE INVENTION

Figure 1:
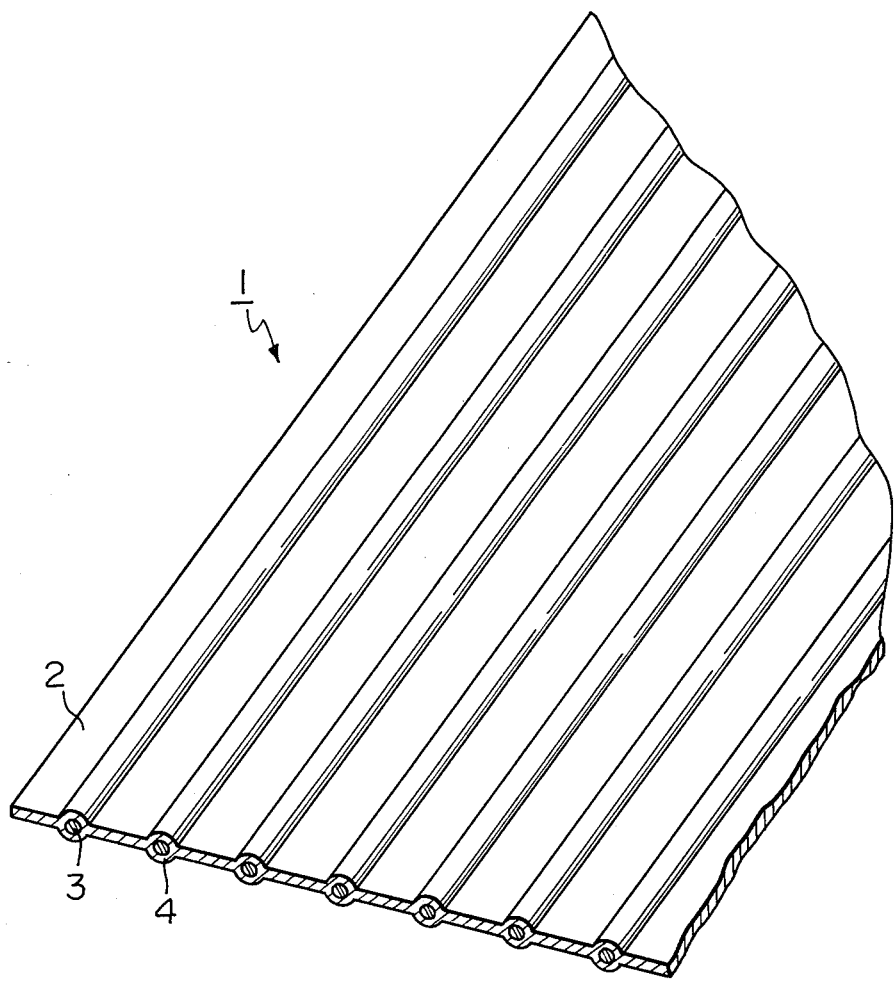
FIG. 1 is a schematic view of an embodiment of the metal wire-containing polymeric laminate tape produced by the process of the present invention.

The process of the present invention is effective for continuously producing a polymeric laminate tape having a plurality of metal wires embedded therewithin.

Referring to FIG. 1, a polymeric laminate tape 1 is composed of a polymeric matrix 2 and a plurality of metal wires 3 embedded within the polymeric matrix 2. The metal wires 3 extend in parallel to each other along the longitudinal axis of the polymeric matrix 2 in the form of a tape at predetermined intervals which are usually equal to each other. The polymeric laminate tape of the present invention is free from air bubbles formed within the polymeric matrix. Also, the metal wires are located in accordance with the predetermined arrangement within the polymeric matrix.

In the process of the present invention, the polymeric matrix in the laminate tape is formed by heat-bonding two primary tapes, comprising an electro-insulating thermoplastic polymer which has been previously cross-linked, to each other. The primary tapes have an excellent heat-resistance and do not exhibit fluidity at the temperature at which the primary tapes are softened and heat-bonded to each other. Therefore, the change in thickness of the primary tapes is small when the primary tapes are heated to the heat-bonding temperature and are pressed together with the metal wires.

That is, referring to FIG. 1, the thicknesses of the polymeric matrix layers 4 surrounding the metal wires 3 are substantially equal to each other. Also, the metal wires are located just between the primary tapes heat-bonded together and are never exposed to the outside of the polymeric matrix 2.

The primary tapes usable for the process of the present invention may comprise at least one thermoplastic polymer selected from the group consisting of polyethylene, polypropylene, ethylene-vinyl acetate copolymers, polyvinyl chloride, polyamides, for example, nylon 6, nylon 66, and nylon 12, and polyesters, for example, polyethylene terephthalate, the polymer having been cross-linked previously by means of actinic rays, for example, electron beams, or by means of a chemical cross-linking agent, for example, peroxide compounds. Usually, the cross-linking procedure for the thermoplastic polymer is carried out preferably to the extent that the resultant cross-linked thermoplastic polymer contains 20 to 90%, more preferably 30 to 80%, of a gel fraction thereof. The percent gel fraction is determined in the following manner. A cross-linked polymer in an amount of 0.15 g is extracted in 30 ml of xylene at a temperature of 120° C. for 24 hours and the extraction residue is dried at a temperature of 80° C. for 16 hours and then weighed. The percent gel fraction is represented by a ratio in % of the weight of the dried extraction residue to the original weight of the cross-linked polymer used. The cross-linked polymer exhibits an enhanced heat resistance. Therefore, the primary tapes usable for the process of the present invention do not melt and exhibit an excellent dimensional stability at the heat-bonding temperature.

The primary tapes usable for the process of the present invention preferably have a thickness of from 10 to 1,000 microns, more preferably from 30 to 500 microns.

Preferable primary tapes for the present invention comprise a polyolefin type polymer such as polyethylene, polypropylene, or an ethylene-vinyl acetate copolymer cross-linked by means of electron beams and containing 30 to 80, more preferably 35 to 70%, of a gel fraction thereof and have a thickness of from 30 to 300 microns.

The metal wires usable for the process of the present invention may be selected from electro-conductive metal wires which are flexible and capable of generating heat when an electric current is applied thereto. For example, the metal wires may consist of copper, a copper-based alloy, or a nickel-chromium alloy and be composed of a single thin thread or two or more threads twisted together. The shape of the cross-sectional profile and the thickness of the metal wires are not limited to the above-mentioned shape and thickness. The metal wires preferably have a round, elliptical, or flat cross-sectional profile with the largest axis being from 0.01 to 1.0 mm, more preferably from 0.05 to 0.6 mm.

When the metal wires have an excessively large thickness, it is difficult to produce a laminate tape which is free from air bubbles formed around the metal wires. When the metal wires are excessively thin, the wires are easily melt-broken by the heat generated by the wires themselves, to which an electric current is applied.

In the procedure for feeding the metal wires between the primary tapes, the metal wires are regulated to a predetermined arrangement. In this case, a pair of wire-regulating rolls may be used. Either one of or both of the rolls have a plurality of grooves formed on the peripheral surfaces thereof and spaced from each other at predetermined intervals.

When introduced into the grooves, the metal wires are regulated under tension so as to be spaced from each other at predetermined intervals. The regulated metal wires are fed in parallel to each other between the primary tapes to be superimposed.

Otherwise, the arrangement of the metal wires may be effected by using a comb-shaped regulating device having a plurality of gaps spaced from each other at predetermined intervals. The metal wires are regulated to the predetermined arrangement while passing through the gaps in the comb-shaped regulating device.

In the process of the present invention, usually, the metal wires are arranged in parallel to each other at intervals of from 0.3 to 5 cm, preferably from 0.5 to 2 cm.

The precursory laminate tape is composed of the primary tapes superimposed side by side along the longitudinal axes thereof and the metal wires embedded between the primary tapes along the longitudinal axes thereof.

The precursory laminate tape is heated up to a temperature of 10° to 120° C., preferably 20° to 110° C., above the melting point of the corresponding thermoplastic polymer which is not cross-linked. The heating procedure is not limited to a special heating method as long as the heating operation can be carried out continuously.

For example, the heating procedure may be carried out in such a manner that a surface of the precursory laminate tape is brought into contact with at least one heating drum rotating at the same peripheral speed as the feeding speed of the precursory laminate tape so as to heat the precursory laminate tape to a predetermined temperature, and heat is irradiated from a heat radiator facing the other surface of the precursory laminate tape toward the other surface. The heat radiator may be replaced by a hot-air blower.

In the above-exemplified heating procedure, the precursory laminate tape is conveyed on the peripheral surface of the heating drum. This procedure is effective for preventing undesirable movement of the metal wires interposed between the primary tapes.

If the heating drum and the heat radiator have a large heating capacity sufficient for heating the precursory laminate tape to a desired temperature, the heating procedure can be completed by using only one heating drum and heat radiator.

The above-mentioned heating procedure may be repeated two or more times in such a manner that the surface of the precursory laminate tape which has been heated by the heat radiator in the previous heating procedure is heated by the heating drum and the other surface of the precursory laminate tape which has been heated by the heating drum is heated by the heat radiator.

The heating drum preferably has a peripheral surface layer thereof which is capable of easily separating the heated precursory laminate tape therefrom. The surface layer is preferably coated with a separating agent, for example, a silicone rubber, or polytetrafluoroethylene.

The heating drum may be heated by flowing a heating medium through the inside space thereof or by heat-radiating or hot-air blowing the peripheral surface of the heating drum.

The heated primary tapes in the precursory laminate tape exhibit a high plasticity sufficient for bonding together at the above-specified temperature under pressure.

The heated precursory laminate tape is subjected to a pressing procedure by using a pair of pressing rolls so as to heat-bond the primary tapes together and to provide a polymeric matrix in which the metal wires are embedded, while eliminating air bubbles formed around the metal wires.

The pressing rolls have peripheral surface layers thereof which are elastic, particularly rubber-like elastic. That is, it is preferable that the peripheral surface layers of the pressing rolls have a Shore A hardness of from 20 to 70, more preferably from 40 to 60, determined in accordance with ASTM D 1525. For this purpose, the peripheral surface layers are made from an elastic rubber material preferably having a high heat-resistance, for example, a silicone rubber.

In the pressing procedure, the precursory laminate tape is pressed usually at a pressure of from 0.5 to 15 kg/cm, more preferably from 2 to 10 kg/cm.

The pressing rolls may serve as cooling rolls for the resultant laminate tape. In this case, the pressing rolls may be cooled by flowing a cooling medium through the inside spaces of the rolls. The cooling effect of the pressing rolls may be small as long as the cooled laminate tape can be easily separated from the peripheral surfaces of the pressing rolls.

The resultant laminate tape is, optionally, subjected to a cooling precedure. The cooling procedure can be carried out by means of any conventional method as long as the laminate tape can be cooled to a desired temperature, usually to room temperature (about 25° C.).

The cooling procedure may be carried out, for example, by bringing the laminate tape into contact with one or more cooling drums which are cooled by flowing a cooling medium, such as water, through the inside spaces thereof. In another cooling method, the laminate tape is brought into direct contact with cooling water. In still another cooling method, cooling air is blown toward the laminate tape.

The cooled laminate tape is usually wound on a core to form a roll. If necessary, the laminate tape may be cut along the longitudinal axis thereof to form two or more narrow tapes. The narrow tapes may be wound separately on a core.

In a modification of the process of the present invention, before superimposing, the primary tapes are pre-heated to approximately the above-mentioned specific temperature. The pre-heated primary tapes are superimposed on each other along the longitudinal axes thereof by using a pair of heat-pressing rolls while a plurality of metal wires are interposed between the heated primary tapes. In this procedure, the superimposed primary tapes and the interposed metal wires are pressed together at the above-mentioned specific temperature so as to heat bond the primary tapes to each other and to the metal wires, while eliminating air bubbles formed around the metal wires. The resultant laminate tape may be cooled to a desired temperature by any conventional cooling method.

The process of the present invention can be carried out, for example, by using an apparatus as indicated in FIG. 2.

Referring to FIG. 2, an upper primary tape 11 comprising an electro-insulating thermoplastic polymer which has been previously cross-linked is fed, under tension, from a roll 11a to a superimposing roll 13 through guide rolls 14, 15, and 16. A lower primary tape 12 comprising the same polymer as that of the upper primary tape 11 is fed, under tension, from a roll 12a to the superimposing roll 13.

A plurality of metal wires 17 are withdrawn from reels 18 and regulated to a predetermined arrangement thereof by a pair of rolls 19a and 19b. The regulated metal wires 17 are fed under tension to the superimposing roll 13 so that they are inserted between the upper primary tape 11 and the lower primary tape 12 and so as to form a precursory laminate tape 20. The precursory laminate tape 20 is introduced into a heating apparatus 21.

The heating apparatus 21 comprises: a first heating drum 22, the peripheral surface of the first heating drum 22 being located close to or contacting the peripheral surface of the superimposing roll 13; a second heating drum 23 located downstream from the first heating drum 22; heat-radiators 24a and 24b each facing the peripheral surface of the first heating drum 22; and heat-radiators 25a and 25b each facing the peripheral surface of the second heating drum 23. The first and second heating drums 22 and 23 rotate at the same peripheral speed as the feeding speed of the precursory laminate tape 20. In the heating apparatus 21, the precursory laminate tape 20 is heated in such a manner that the upper surface of the precursory laminate tape 20 is brought into direct contact with the peripheral surface of the first heating drum 22 so as to be heated up to the predetermined temperature, and the lower surface of the precursory laminate tape 20 is heated by a heat radiating from the lower heat-radiator 24a. Thereafter, the precursory laminate tape 20 is withdrawn from the first heating drum 22 and is then introduced into the second heating drum 23. The lower surface of the precursory laminate tape 20 is brought into direct contact with the peripheral surface of the second heating drum 23 so as to be heated up to the predetermined temperature, while the upper surface of the precursory laminate tape 20 is heated to the predetermined temperature by the upper heat-radiator 25a.

The upper heat-radiator 24b is used to heat the peripheral surface of the first heating drum 22 to a desired temperature. Likewise, the lower heat-radiator 25b is used to heat the peripheral surface of the second heating drum 23 to a desired temperature.

The heated precursory laminate tape 20 is introduced into a pair of pressing rolls 26a and 26b so as to be pressed. During the pressing procedure, the heated upper and lower primary tapes in the precursory laminate tape 20 are heat-bonded to each other so as to form a body of polymer matrix within which the metal wires are embedded. The polymer matrix is firmly bonded to the embedded metal wires, and a polymeric laminate tape 27 is obtained. The laminate tape 27 is cooled to a desired temperature, for example, room temperature, while contacting the peripheral surfaces of the cooling drums 28 and 29. The cooled laminate tape 27 is wound to form a roll 30.

The process of the present invention is highly effective for continuously producing, at a high speed, a metal wire-containing polymeric laminate tape which is substantially free from air bubbles formed around the metal wires. In the resultant laminate tape, the metal wires are located in accordance with the predetermined arrangement exactly in the middle layer portion thereof. Therefore, it is unnecessary to subject the resultant laminate tape to a cross-linking procedure which is dangerous for workers due to the electroconductive metal wires embedded therein.

We claim:

1. A process for continuously producing a polymeric laminate tape having a plurality of metal wires embedded therewithin, comprising the continuous steps of:
   superimposing a pair of primary tapes, comprising an electro-insulating thermoplastic polymer which has been cross-linked, on each other along the longitudinal axes thereof under tension, while a plurality of metal wires are interposed, in parallel to each other, between said primary tapes along the longitudinal axes of said primary tapes, under tension, to provide a precursory laminate tape;
   heating said precursory laminate tape up to a temperature of from 10° to 120° C. above the melting point of corresponding electro-insulating thermoplastic polymer which is not cross-linked; and
   pressing said heated precursory laminate tape by using a pair of pressing rolls each having an elastic peripheral surface layer thereof, whereby said primary tapes are heat-bonded to each other to form a body of laminate matrix within which said metal wires are embedded.

2. The process as claimed in claim 1, wherein said primary tapes comprise at least one thermoplastic polymer selected from the group consisting of polyethylene, polypropylene, ethylene-vinyl acetate copolymers, polyvinyl chloride, polyamides and polyesters, said polymer having been cross-linked by means of actinic rays or a chemical cross-linking agent.

3. The process as claimed in claim 1, wherein said cross-linked thermoplastic polymer contains 20 to 90% of a gel fraction thereof.

4. The process as claimed in claim 1, wherein said primary tapes have a thickness of from 10 to 1000 microns.

5. The process as claimed in claim 1, wherein said metal wires are capable of generating heat when an electric current is applied thereto.

6. The process as claimed in claim 1, wherein the largest axis of the cross-sectional profile of each metal wire is from 0.01 to 1.0 mm.

7. The process as claimed in claim 1, wherein said metal wires are spaced from each other at predetermined intervals.

8. The process as claimed in claim 7, wherein said intervals are in the range of from 0.3 to 5 cm.

9. The process as claimed in claim 1, wherein said heating procedure is carried out in such a manner that a surface of said precursory laminate tape is brought into contact with at least one heating drum rotating at the same peripheral speed as the feeding speed of said precursory laminate tape, whereby said precursory laminate tape is heated to a predetermined temperature, and heat is irradiated from a heat radiator facing the other surface of said precursory laminate tape toward said other surface.

10. The process as claimed in claim 9, wherein said heating procedure is repeated two or more times in such a manner that the surface of said precursory laminate tape which has been heated by the heat radiator in the previous heating procedure is heated by said heating drum and the other surface of said precursory laminate tape which has been heated by the heating drum is heated by said heat-radiator, whereby said precursory laminate tape is heated to a predetermined temperature.

11. The process as claimed in claim 1, wherein said elastic peripheral surfaces of said pressing rolls have a Shore A hardness of from 20 to 70, determined in accordance with ASTM D 1525.

12. The process as claimed in claim 1, wherein said pressing procedure is carried out under a pressure of from 0.5 to 15 kg/cm.

13. The process as claimed in claim 1, wherein after the pressing procedure, said resultant laminate tape is subjected to a cooling procedure.

* * * * *